No. 676,821. Patented June 18, 1901.
L. NEUMAYER.
ADVERTISING VEHICLE.
(Application filed June 1, 1900.)
(No Model.)
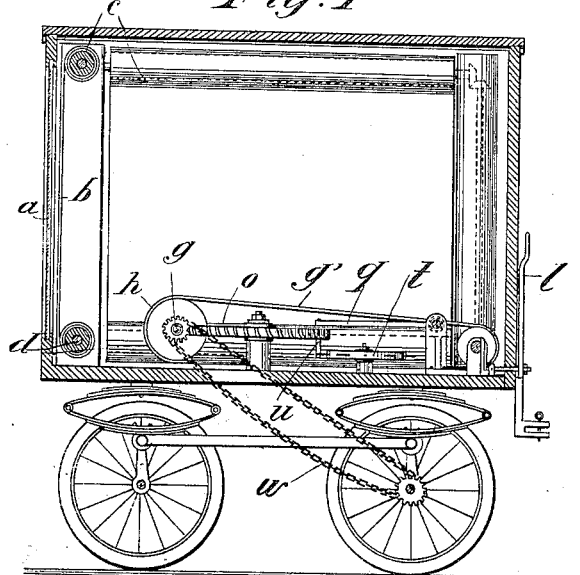
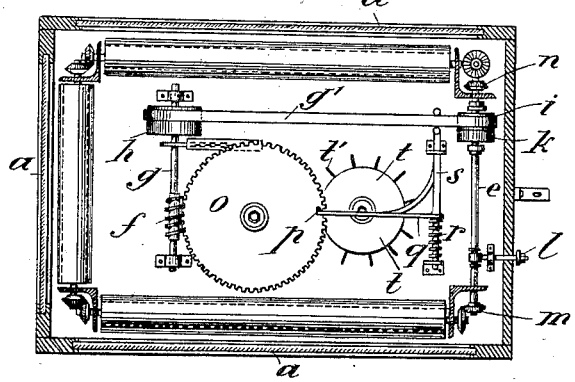
Witnesses:
Inventor:
Ludwig Neumayer
per
Attorney.

UNITED STATES PATENT OFFICE.

LUDWIG NEUMAYER, OF MERSEBURG, GERMANY.

ADVERTISING-VEHICLE.

SPECIFICATION forming part of Letters Patent No. 676,821, dated June 18, 1901.

Application filed June 1, 1900. Serial No. 18,752. (No model.)

*To all whom it may concern:*

Be it known that I, LUDWIG NEUMAYER, a subject of the Emperor of Germany, and a resident of Merseburg, Germany, have invented certain new and useful Improvements in Advertising-Vehicles with Movable Advertisements, of which the following is a specification.

The object of my present invention is to provide an advertising-vehicle with changing or movable advertisements arranged on three sides of the vehicle and slowly unrolled from one cylinder and rolled upon another, the movements of the advertisement being obtained from the axle of the vehicle through the agency of suitable transmission devices and a device for regulating the intermittent movement of the advertisements.

In the accompanying drawings, forming a portion of my invention, Figure 1 is a vertical section of the improved advertising-vehicle, and Fig. 2 is a horizontal section of same.

The side and back walls of the advertising-vehicle are formed of plates $a$, made of glass or other transparent material. Near each one of these glass walls are journaled an upper and a lower roller $c$ $d$, upon which is rolled a long band $b$, provided with advertisements, and the portion of which stretched between the rollers can be seen through the glass plates $a$. The rollers $d$ and the rollers $c$ are geared together by means of bevel gear-wheels, as shown, so that they rotate in unison. The mechanism is actuated by the axle of the vehicle through the agency of a chain $w$, actuating a shaft $g$, carrying a belt-pulley $h$, mechanically connected by means of a belt $g'$ with a loose pulley $i$ and with a keyed pulley $k$, mounted upon a shaft $e$, which may be moved longitudinally by means of a lever $l$. The ends of said shaft $e$ are provided with bevel gear-wheels $m$ $n$, adapted to mesh successively as follows: $m$ with a gear-wheel on rollers $d$ and $n$ with a gear-wheel keyed on a vertical shaft geared with the upper rollers $c$.

The transmission-shaft $g$ is provided with a worm $f$, meshing with a worm gear-wheel rotating on a stud secured to the bottom of the vehicle, said wheel $o$ being provided with a projecting pin $p$, adapted to engage after each revolution of the wheel an arm $q$, connected with a rod $s$, whereby the latter is moved laterally to a certain distance after each revolution of the wheel $o$. The rod $s$ is provided at one end with a fork, through the branches of which works the driving-belt $g'$, whereby the latter is brought from the loose pulley $i$ upon the fixed pulley $k$, when the rod $s$ is moved as stated, so that the movements of the upper or of the lower rollers move the advertising-bands forwardly. After the pin $p$ is released from the arm $q$ the forked end of rod $s$ is brought back to its initial position by the action of a spring $r$, whereby the driving-belt is again brought upon the loose pulley, whereupon the advertising-band is stopped. The worm gear-wheel $o$ is provided on its under side with a projecting pin $u$, engaging at each revolution the periphery of a disk $t$, to move the latter forward by one pin or tooth. This disk is provided with as many pins $t'$ as there are advertisements on the band, and the last pin is formed so that it actuates an alarm (not shown in the drawings) whereby the carman is notified to reverse the lever $l$, whereby the shaft $e$ is moved longitudinally and whereby the advertising-band is actuated in an opposite direction.

The device may be modified by employing two vertical rollers and moving the advertising-band behind the three transparent walls of the vehicle.

The vehicle itself may be moved in any desired way, either by horses, velocipede, or autocar, or said vehicle may be constructed in the form of a motor-car.

Having fully described my invention, what I claim, and desire to secure by Letters Patent, is—

1. In an advertising-vehicle the combination with the walls of the vehicle made of suitable transparent material, a series of rollers journaled at the upper ends of said transparent walls, another series of rollers journaled at the lower ends of the transparent walls, and advertising-bands extending around the pairs of upper and lower rollers; of bevel gear-wheels on the ends of the roller-shafts and meshing with each other; a longitudinally-movable shaft journaled near the bottom of the vehicle: a toothed wheel on each end of said shaft, and adapted to mesh one at a time with one of the gear-wheels on the lower-roller ends; a loose pulley and a fixed pulley on said shaft, and suitable connections between the latter and the axle of the vehicle, substantially as set forth.

2. In an advertising-vehicle the combination with the walls of the vehicle made of suitable transparent material, a series of rollers journaled at the upper ends of said transparent walls, another series of rollers journaled at the lower ends of the transparent walls, and advertising-bands, extending around the pairs of upper and lower rollers of bevel gear-wheels on the ends of the roller-shafts and meshing with each other; a longitudinally-movable shaft journaled near the bottom of the vehicle, a toothed wheel on each end of said shaft, and adapted to mesh one at a time with one of the gear-wheels on the lower-roller ends, a loose pulley and a fixed pulley on said shaft; another transmission-shaft arranged parallel to the longitudinally-movable shaft; a fixed pulley on the second transmission-shaft; a belt extending around said pulley and around the loose pulley above mentioned, said belt being adapted to be moved from the loose pulley upon the fixed pulley; a worm on the last-mentioned shaft, a worm gear-wheel meshing with said worm, a projecting pin on said gear-wheel, and a fork for guiding the aforesaid belt and adapted to be engaged by said pin after each revolution of the worm gear-wheel, and means for bringing the fork back to its initial position, substantially as set forth.

3. In a device of the character described, the combination with a horizontal shaft, another longitudinally-movable parallel shaft, a fixed pulley on the first shaft a fixed and a loose pulley on the second shaft, and a belt extending around said pulley, of a threaded portion on the first shaft, a worm gear-wheel meshing with said threaded portion, an upper projecting pin on the gear-wheel and adapted to move the said belt from the fixed pulley upon the loose pulley after each revolution of said wheel and through suitable connections, a lower projecting pin on the worm gear-wheel, and a rotatable disk, having peripherically-projecting pins adapted to be engaged by said lower projecting pin, said disk being provided to operate at a given moment, a proper alarm device, and suitable connections between the first-mentioned shaft and the axle of a vehicle, substantially as set forth.

In testimony whereof I have hereunto set my hand in presence of two witnesses.

LUDWIG NEUMAYER.

Witnesses:
RUDOLPH FRICKE,
CHAS. J. BURT.